United States Patent [19]
Nakayama et al.

[11] Patent Number: 5,811,019
[45] Date of Patent: Sep. 22, 1998

[54] METHOD FOR FORMING A HOLE AND METHOD FOR FORMING NOZZLE IN ORIFICE PLATE OF PRINTING HEAD

[75] Inventors: Tetsuo Nakayama, Tokyo; Koichiro Kishima, Kanagawa; Makoto Ando, Tokyo; Takaaki Murakami, Kanagawa, all of Japan

[73] Assignee: Sony Corporation, Tokyo, Japan

[21] Appl. No.: 622,702

[22] Filed: Mar. 26, 1996

[30] Foreign Application Priority Data

Mar. 31, 1995 [JP] Japan ................................. 7-075376
Mar. 31, 1995 [JP] Japan ................................. 7-075377

[51] Int. Cl.$^6$ ........................................ B41J 2/16
[52] U.S. Cl. .................. 216/27; 219/121.71; 347/47; 29/890.1
[58] Field of Search .................. 216/27, 17; 219/121.71

[56] References Cited

U.S. PATENT DOCUMENTS

| | | | |
|---|---|---|---|
| 4,894,115 | 1/1990 | Eichelberger et al. | 156/643.1 |
| 4,959,119 | 9/1990 | Lantzer | 156/644 |
| 5,305,015 | 4/1994 | Schantz et al. | 346/1.1 |
| 5,305,018 | 4/1994 | Schantz et al. | 346/1.1 |
| 5,312,517 | 5/1994 | Ouki | 156/643.1 |

*Primary Examiner*—R. Bruce Breneman
*Assistant Examiner*—Michael E. Adjodha
*Attorney, Agent, or Firm*—Hill, Steadman & Simpson

[57] ABSTRACT

A method for a hole inclined relative to the direction of thickness of a workpiece by light energy. A groove is formed in an energy-concentrated portion of a plate as a workpiece for opening on a major surface of a plate operating as a light energy irradiated surface for forming an irregular surface portion. The light energy is illuminated on this irregular surface portion from the major surface of the plate in an oblique direction relative to the direction of thickness of the plate. The irregular surface portion of the workpiece is formed integrally with the workpiece by injection molding. The irregular surface portion may also be formed by sandblasting, chemical etching or by an abrasive brush. The light energy is a laser, especially an excimer laser. The workpiece may be formed of an inorganic material, an organic material or a metallic material. The hole of a larger angle of inclination is formed by employing the light energy.

15 Claims, 9 Drawing Sheets

METHOD FOR FORMING A HOLE AND METHOD FOR FORMING NOZZLE IN ORIFICE PLATE OF PRINTING HEAD

BACKGROUND OF THE INVENTION

1. Field of the Invention

This invention relates to a method for forming a hole inclined relative to the direction of thickness of a workpiece by light energy. More particularly, it relates to a method for forming a hole in which an irregular surface portion is formed in an energy-concentrated portion of the workpiece so that the light energy may be prohibited from being reflected even in case of the incident angle of the light energy exceeding the critical angle for allowing to form a hole with a larger angle of inclination relative to the direction of thickness of the workpiece.

2. Related Art

Recently, a so-called on-demand type printing apparatus, dispensing liquid ink drops from a nozzle responsive to recording signals for recording on a recording medium, such as paper or films, has rapidly come into popular use since it lends itself to reduction in size and production costs.

Meanwhile, a demand is recently increasing for outputting not only letters or pictures but also colored natural pictures similar to photographs along with the letters or figures. In keeping with this demand, it has been a desideratum to print a high-quality natural picture, and reproduction of a half-tone has become critical.

For enabling reproduction of the half-tone, the present inventors have proposed a printing head, in which the density of dots printed may be controlled by discharging an ink solution obtained on mixing the ink and a diluting solution and by varying the density of the ink solution for printing the natural picture without deteriorating the resolution.

Such printing head is made up of a portion adapted for applying the force of discharging the ink or the diluting solution to the ink or the diluting solution, such as an ink reservoir or a diluting solution reservoir, having a piezo-element or a heating element, and a nozzle portion (so-called orifice plate) for guiding the discharging of the ink or the diluting solution.

The orifice plate is formed with a through-hole operating as an ink nozzle and another through-hole operating as a nozzle for a dilution solution. These two through-holes are of extremely small diameters.

Thus, these through-holes are difficult to form with a boring machine or a drill since there is a limit on the minimum size and accuracy in opening size cannot be maintained if plural through-holes are to be formed due to wear produced in the cutting chips. The through-holes are also difficult to form using an ultrasonic cutting method.

It may be envisaged to form these through-holes by techniques such as reactive ion etching (RIE) or ion milling employed in a semiconductor production process. These techniques are however inappropriate since a workpiece of a thickness sufficient for use as an orifice plate can be worked by this technique only by an extremely time-consuming operation.

The present inventors have proposed in Japanese patent Application No. 7-88999 an orifice plate in which at least one of a through-hole operating as an ink nozzle and a second through-hole operating as a through-hole for the dilution solution are formed obliquely relative to the direction of thickness of the orifice plate. However, It is however extremely difficult to form the through-hole obliquely by a method employing a boring machine or a drill or by an ultrasonic method.

Thus the through-hole in an orifice plate, which is small in diameter and which needs occasionally to be formed obliquely, is formed by illuminating the light energy, such as that of a laser. Since the laser can be reduced in beam diameter and radiation diameter, it is suited to formation of a hole with a small diameter. As laser, carbon dioxide gas laser or a YAG laser may be employed in addition to an excimer laser.

In laser working, a laser beam having the same angle of inclination as that of the through-hole to be formed is illuminated from the workpiece surface for forming the through-hole in the proceeding direction of the laser beam.

OBJECT AND SUMMARY OF THE INVENTION

It is therefore an object of the present invention to provide a method for forming a through-hole having a larger angle of inclination using a light energy.

In one aspect, the present invention provides a method for forming a hole including forming an irregular surface portion in an energy-concentrated portion of a workpiece, and radiating the light energy on the irregular surface portion for forming a hole inclined relative to the direction of thickness of the workpiece.

In another aspect, the present invention provides a method for forming a nozzle in an orifice plate for a printing head including irradiating an irregular surface portion of the surface of the orifice plate with a light energy for forming a hole inclined at a pre-set angle relative to the direction of thickness of the orifice plate.

In still another aspect, the present invention provides a method for forming a first nozzle in an orifice plate for a printing head including forming a first nozzle inclined at a pre-set angle relative to the direction of thickness of the orifice plate and forming a second nozzle normal to the direction of thickness of the orifice plate in adjacency to the first nozzle. The first and second nozzles are formed by irradiation with a light energy and at least the portion in which the first nozzle is formed is formed with an irregular surface portion before being irradiated with the light energy.

The irregular surface portion of the workpiece is formed integrally with the workpiece by injection molding.

The irregular surface portion may also be formed by sand-blasting, chemical etching or by an abrasive brush.

The light energy is a laser, especially an excimer laser.

The workpiece may be formed of an inorganic material, an organic material or a metallic material.

The method for forming the hole according to the present invention is suited for forming a through-hole in an orifice plate. The thickness of the hole-forming portion of the workpiece is preferably 15 to 200 μm.

In the hole-forming method of the present invention, in which the irregular surface portion is provided in the energy-concentrated portion of the workpiece, and the light energy is radiated on this irregular surface portion, there is formed a wall lying in the path of the reflected light energy, or the state of light energy engagement may be improved. Thus the angle of inclination of the light energy may be improved and working is started for forming a hole inclined relative to the direction of thickness of the workpiece while there is no risk of light reflection even for an incident angle larger than the working critical angle.

If the irregular surface portion of the workpiece is integrally formed with the workpiece by injection molding, a large number of workpieces may be worked simultaneously, thereby improving the productivity.

If the irregular surface portion is formed by sand-blasting or chemical etching or using an abrasive brush, the irregular surface portion is worked as fine-sized irregular surface portions.

If the laser is employed as the light energy, small-diameter holes may be formed. In addition, if the excimer laser is employed as the laser, working may be performed without thermally affecting the workpiece, so that only the portion irradiated with the laser light beam can be worked to high quality.

With the method for forming the orifice plate employing the hole forming method according to the, present invention, since the irregular surface portion is formed in the energy-concentrated portion of the plate as a workpiece, and the light energy is radiated on this irregular surface portion, the working by light energy may be facilitated. Working may be initiated without light reflection even for the light incident angle exceeding the working critical angle, so that a through-hole may be formed which has an inclination angle relative to the direction of plate thickness exceeding the working critical angle of the light energy.

If the irregular surface portion of the plate is formed by sand-blasting, chemical etching or an abrasive brush, the irregular surface portion is formed as plural irregular surface portions.

If the laser is used as the light energy in the above-described embodiment, small-diameter holes may be worked easily. If the excimer laser is used as the laser, the workpiece may be worked without being thermally affected so that high-quality working may be achieved only at the laser light irradiated portion.

DETAILED DESCRIPTION OF THE PREFERRED EMBODIMENTS

Figure 1:
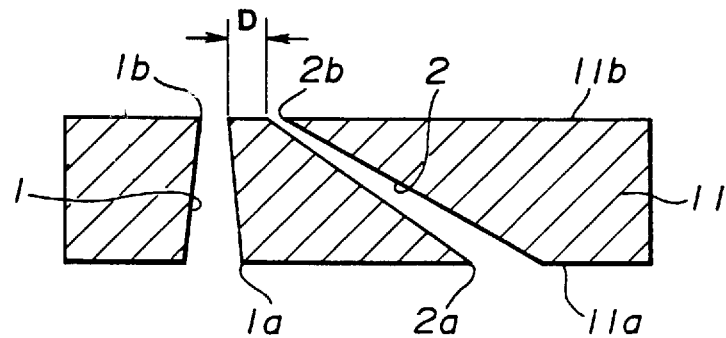
FIG. 1 is a cross-sectional view showing an orifice plate produced by a method for producing an orifice plate according to the present invention.

Referring to the drawings, preferred embodiments of the present invention will be explained in detail. In the present embodiment, the method for forming a hole according to the present invention is applied to production of an orifice plate.

FIG. 1 shows an orifice plate 11 prepared in the instant embodiment. The orifice plate 11 has a pair of through-holes 1, 2 extending from its major surface 11a to the other major surface 11b. The opening ends of the through-holes 1, 2 on the major surface 11a serve as liquid supply ports 1a, 2a, while the opening ends of the through-holes 1, 2 on the opposite major surface 11b serve as liquid discharge ports 1b, 2b.

The through-hole is formed obliquely through the orifice plate 11 at an inclination relative to the thickness of the orifice plate 11, while the through-hole 1 is formed parallel to the thickness of the orifice plate. The through-holes 2 and 1 are referred to hereinafter as first and second through-holes, respectively. The first through-hole 2 approaches the liquid discharge port 1b of the through-hole 1 in a direction proceeding towards the liquid discharge port 2b.

In the above-described orifice plate, the first through-hole 2 and the second through-hole 1 serve as nozzles for the ink and for the dilution solution, respectively.

Figure 2:
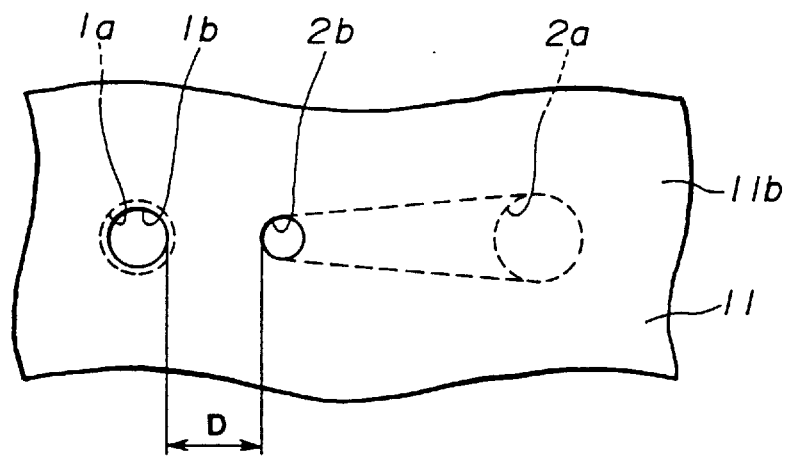
FIG. 2 is a plan view showing an orifice plate produced by a method for producing an orifice plate according to the present invention.

In the above-described orifice plate, the first through-hole 2 and the second through-hole 1 are reduced in cross-section in a direction proceeding from the liquid supply ports 2a, 1a towards the liquid discharge ports 2b, 1b, respectively, as shown in Figs.1 and 2. That is, if the cross-sectional areas of the liquid supply ports 2a, 1a of the first and second through-holes 2, 1 are S2a, S1a, respectively, and the cross-sectional areas of the liquid discharge ports 2b, 1b thereof are S2b, S1b, respectively, the relation S2b<S2a and the relation S1b<S1a hold.

The thickness of the orifice plate is selected to be 15 to 100 $\mu$m for stabilizing the flight direction of liquid droplet and for withstanding the elevated liquid pressure.

Figure 3:
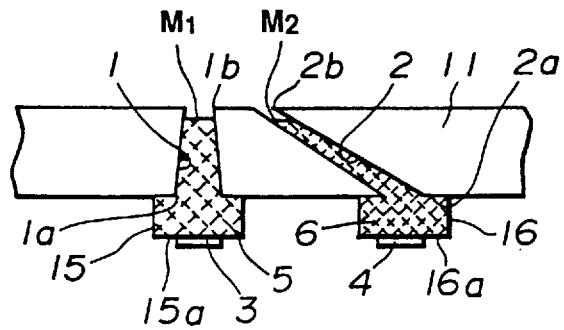
FIG. 3 schematically shows sequential operations of a printing head employing a produced orifice plate and the state in which a meniscus is formed on the produced orifice plate.

A printing head employing the orifice plate produced in the instant embodiment is now explained. The printing head is of a carrier jet type in which a box-shaped ink reservoir 16 filled with an ink 6 is arranged in the liquid supply port 2a of the first through-hole 2 and a box-shaped dilution solution reservoir 15 filled with a dilution solution 5 is arranged in the liquid supply port 1a of the second through-hole 1, as shown in FIG. 3. A heating element 3 and another heating element 4 are arranged on a bottom surface 15a of the dilution solution reservoir 15 and on a bottom surface 16a of the ink reservoir 16, respectively.

For printing by the printing head, the ink 6 charged into the ink reservoir 16 is charged into the first through-hole 2 by a capillary phenomenon for forming a first meniscus M2, while the dilution solution 5 charged into the dilution solution reservoir 15 is charged into the second through-hole 1 by a capillary phenomenon for forming a second meniscus M1, as shown in FIG. 3.

Figure 4:
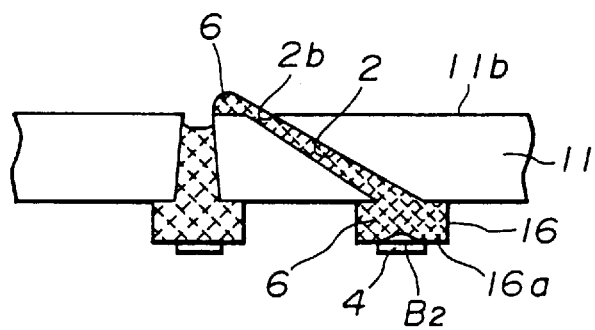
FIG. 4 schematically shows sequential operations of a printing head employing a produced orifice plate and the state in which the ink has been extruded out of the through-hole.

A voltage pulse is then supplied to the heating element 4 arranged on the bottom surface 16a of the ink reservoir 16 for heating the ink 6 within the ink reservoir 16 for producing a bubble B2 at a position registering with the heating element 4. The pressure within the ink reservoir 16 and hence the pressure within the first through-hole 2 are then raised, so that the ink 6 within the through-hole 2 is extruded and deposited as a droplet on the major surface 11b of the orifice plate 11, as shown in FIG. 4. The amount of the extruded ink 6 depends upon the pulse width or the voltage value of the voltage pulse supplied to the heating element 4.

Figure 5:
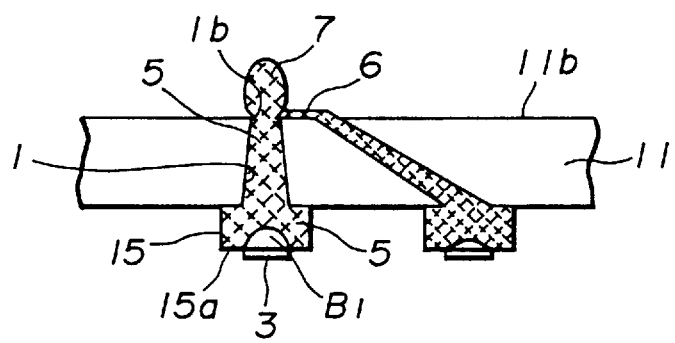
FIG. 5 schematically shows sequential operations of a printing head employing a produced orifice plate and the state in which the dilution solution has been extruded out of the through-hole to form an ink solution.

A voltage pulse is then applied to the heating element 3 arranged on the bottom surface 15a of the dilution solution reservoir 15 for heating the dilution solution 5 in the dilution solution reservoir 15 for generating a bubble B1 at a position registering with the heating element 3, as shown in FIG. 5. The pressure within the dilution solution reservoir 15 and hence the pressure within the second through-hole 1 are then raised, so that the dilution solution 5 within the through-hole 1 is extruded at the liquid discharge port 1b so as to be unified with the droplet of the ink 6 deposited on the major surface 11b of the orifice plate 11 to form an ink solution 7 in the form of a droplet, as shown in FIG. 5.

Figure 6:
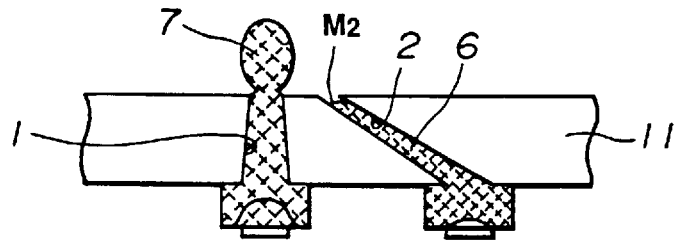
FIG. 6 schematically shows sequential operations of a printing head employing a produced orifice plate and the state in which the ink solution has been grown in a columnar shape.

If the voltage pulse ceases to be supplied to the heating element 4 at or before this time, the bubble B2 vanished rapidly, so that the internal pressure within the ink reservoir 16 and the first through-hole 2 is lowered. This strips the ink solution 7 from the ink 6, as shown in FIG. 6, with the ink 6 being receded into the first through-hole 2 for again forming a meniscus M2. The ink solution 7 grows in a column shape.

Figure 7:
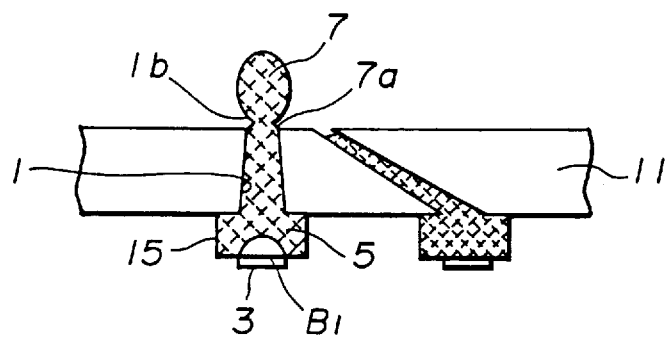
FIG. 7 schematically shows sequential operations of a printing head employing a produced orifice plate and the state in which a constriction has been produced in the columnar-shaped ink solution.

The voltage pulse to the heating element 3 is then terminated. The bubble B1 then vanished quickly, as shown in FIG. 7, thus lowering the pressure within the dilution solution reservoir 15 and within the second through-hole 1 to recede the dilution solution 5 into the through-hole 1. This produces a constriction 7a at the side of the liquid discharge port 1b of the ink solution 7.

Figure 8:
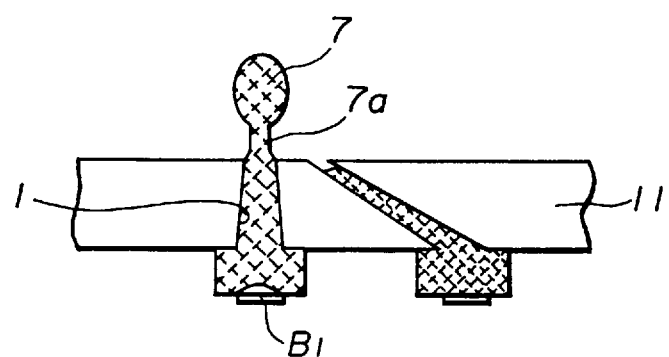
FIG. 8 schematically shows sequential operations of a printing head employing a produced orifice plate and the state in which the ink solution about to start its flight.
Figure 9:
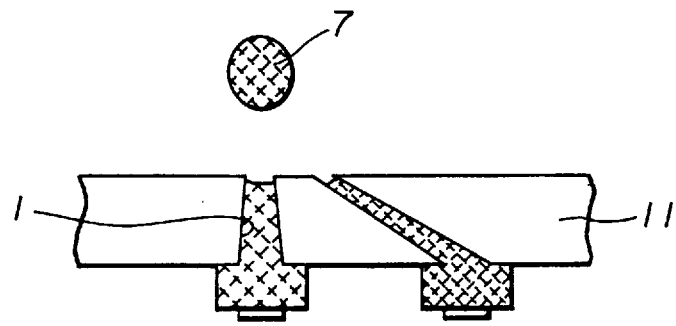
FIG. 9 schematically shows sequential operations of a printing head employing a produced orifice plate and the state in which the ink solution has flown into air.

As the bubble B1 is further reduced in size, flight of the ink solution 7 starts, as shown in FIG. 8, until the ink solution 7 flies into air, as shown in FIG. 9. The ink solution 7 becomes deposited on a recording medium to effect printing.

The density of the ink solution 7, which is a mixture of the ink and the dilution solution, is determined by the amount of the ink 6 extruded from the first through-hole 2, and may be controlled by the amplitude or the width of the voltage pulse applied to the heating element 4. If the amplitude or the width is increased or decreased, the amount of the ink 6 is increased or decreased, respectively, thus varying the density of the ink solution 7. The amplitude or width of the voltage pulse may be varied in a range determined by experiments to an optimum value.

The above-described sequence of operations in the printing head is merely exemplary and the timing or states of the respective operations, such as the shape or the charging performance of the ink solution, are varied with structural elements, such as the size of the liquid discharge ports, physical elements, such as viscosity or surface tension of the ink or the dilution solution, or operating conditions, such as discharging frequency.

The method for producing the orifice plate employing the method for forming a hole according to the present invention is explained.

Figure 10:
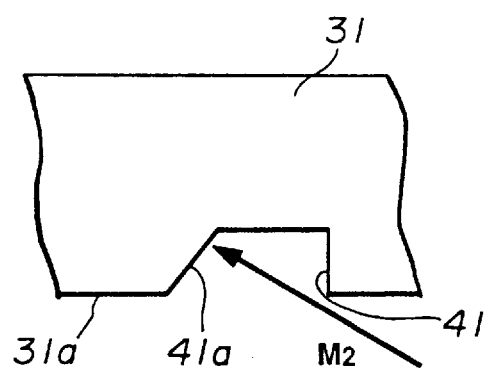
FIG. 10 shows a process step in an illustrative method for producing an orifice plate employing a method for producing an orifice according to the present invention, showing the state in which a groove is formed in the orifice plate.

First, a plate 31 which is to be an orifice plate is provided. In the present embodiment, the plate is formed of an organic material, such as high molecular material, and is produced by injection molding. In the present embodiment, when forming the plate 31, as a workpiece, by injection molding, a groove 41 opened on a major surface 31a of the plate 31 as a light irradiated surface is formed, as shown in FIG. 10. This groove 41 is formed at a energy-concentrated portion of the plate irradiated with the light energy for forming an obliquely extending through-hole.

The groove 41 is substantially U-shaped in cross-section and has an inclined lateral side 41a lying along the light energy proceeding direction.

Figure 11:
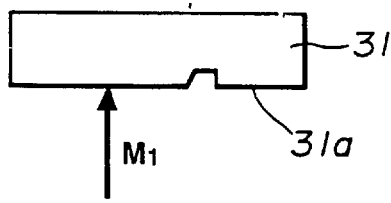
FIG. 11 shows a process step in an illustrative method for producing an orifice plate employing a method for producing an orifice according to the present invention, showing the state in which the light energy is being radiated for forming a second through-hole in a plate.

The light energy, such as a laser light energy, is radiated from the major surface 31a of the plate 31, along the thickness of the plate 31, as indicated by arrow M1 in FIG. 11. As the laser, enumerated by an excimer laser, a carbon dioxide laser or a YAG laser, the excimer laser is herein employed.

If the excimer laser is employed for working, molecular bondage is severed for vaporizing and removing substances by a working termed ablation, thus reducing thermal effects encountered in conventional thermal working and assuring high-quality working of only portions irradiated with the laser beam.

This produces a second through-hole 32 traversing the plate 31 along its thickness from its major surface 31a to its opposite major surface 31b with an opening end 32a on the major surface 31a and an opening end 32b on the major surface 31b operating as a liquid supply port and as a liquid discharge port, respectively. Since the second through-hole 32 is formed by laser radiation, the through-hole 32 has a cross-sectional area S32a on the major surface 31a on the light energy incident side which is larger than a cross-sectional area S32b on the opposite major surface side 31b, so that the relation S32b<S32a holds.

Figure 12:
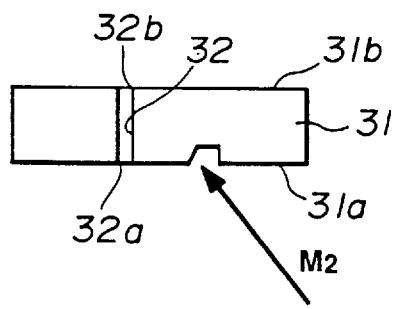
FIG. 12 shows a process step in an illustrative method for producing an orifice plate employing a method for producing an orifice according to the present invention, showing the state in which the light energy is being radiated for forming a first through-hole in a plate.
Figure 13:
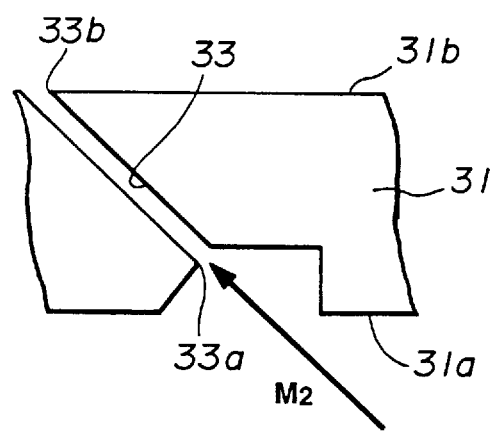
FIG. 13 shows a process step in an illustrative method for producing an orifice plate employing a method for producing an orifice according to the present invention, showing the state in which the first through-hole has been formed in a plate.

The light energy, such as the laser light energy, is radiated from the major surface 31a of the plate 31 obliquely relative to the direction of thickness thereof, as shown in FIG. 12. The light energy radiating direction is set so as to approach the opening 32b, that is the liquid discharge port of the second through-hole 32, in a direction proceeding from the major surface 31a towards the major surface 31b. As the laser, enumerated by an excimer laser, a carbon dioxide laser or a YAG laser, the excimer laser is again employed.

Since the groove 41 is formed in the instant embodiment as an irregular surface portion in an energy-concentrated portion in the plate 31, that is a workpiece, in which the obliquely directed light energy is concentrated for forming the obliquely extending through-hole in the plate 31, the light energy indicated by arrow M2 in FIG. 10 is radiated on the inclined lateral side 41a of the groove 41.

Since the lateral side 41a is an inclined surface, the light energy indicated by arrow M2 is incident on the lateral side 41a at an angle close to a right angle. The incident light proceeds along a straight path for working.

Figure 14:
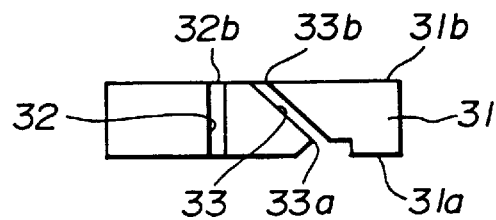
FIG. 14 shows a process step in an illustrative method for producing an orifice plate employing a method for producing an orifice according to the present invention, showing the completed state of the orifice plate.
Figure 15:
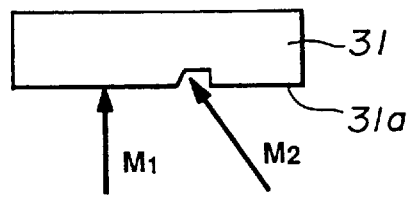
FIG. 15 shows a modification of the method for producing the orifice plate employing a method for forming an orifice plate according to the present invention, and showing the state in which the light energy is being radiated for forming first and second through-holes in a plate.

This produces a first through-hole 33 traversing the plate 31 along its thickness from its major surface 31a to its opposite major surface 31b, with an opening end 33a on the major surface 31a and an opening end 33b on the major surface 31b operating as a liquid supply port and as a liquid discharge port, respectively, thus completing an orifice plate having the obliquely extending first through-hole 33 and the second through-hole 32 extending along the thickness thereof, as shown in FIG. 14.

Since the first through-hole 33 is formed by excimer laser irradiation, the cross-sectional area S33a thereof on the major surface 31a on the light energy incident side becomes larger than the cross-sectional area S33b on the opposite major surface 31b, so that the relation S33b<S33a holds. The first through-hole 33 is formed so that the opening end 32b as the liquid discharge port of the second through-hole 33 is approached in a direction proceeding towards the opening 33b as the liquid discharge port.

Although the first through-hole is formed in the above-described production method after formation of the second through-hole, the light energies employed in the above-described production method, indicated by arrows M1 and M2, may be radiated simultaneously from the major surface 31a of the plate 31 for simultaneously forming the first and second through-holes in the orifice plate.

Although the groove having a substantially U-shaped cross-section, and having an inclined surface lying in the light path of the light energy, is formed in the plate 31, that is a workpiece, in the above-described production process for providing an irregular surface portion on the energy-concentrated portion of the plate 31, the irregular surface portion may also be formed as a groove 51 of a U-shaped cross-section opening on the major surface 31a operating as a light energy irradiated surface.

Figure 16:
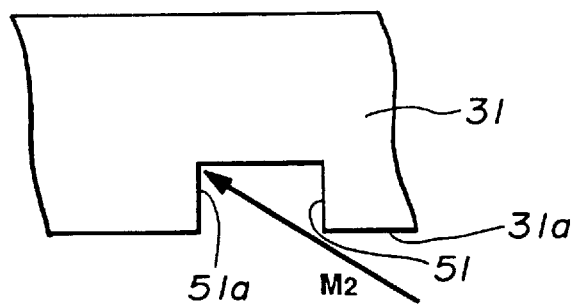
FIG. 16 shows a process step in a second modification of the method for producing the orifice plate employing a method for forming an orifice plate according to the present invention, and showing the state in which a groove is being formed in a plate.
Figure 17:
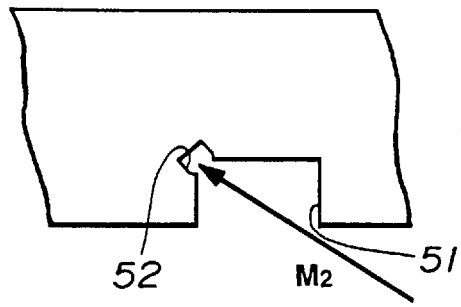
FIG. 17 shows a process step in the second modification of the method for producing the orifice plate employing a method for forming an orifice plate according to the present invention, and showing the state in which a hole has been formed in the bottom of the groove formed in the plate.
Figure 18:
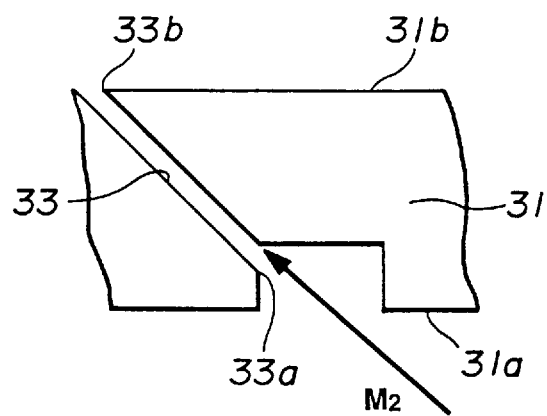
FIG. 18 shows a process step in the second modification of the method for producing the orifice plate employing a method for forming an orifice plate according to the present invention, and showing the state in which a first through-hole has been formed in the plate.

If the light energy as indicated by arrow M2 in FIG. 16 is radiated from the major surface 31a of the plate 31 formed with such groove 51, the light energy is reflected in a direction opposite to the incident direction. However, it is leaped back by a lateral side 51a operating as a wall. Thus the working is started at this portion to form a small hole 52 on the bottom surface of the groove 51, as shown in FIG. 17, for enhancing the engagement of the light energy with the workpiece for starting the working in the light energy incident direction. This produces a first through-hole 33 traversing the plate 31 along its thickness from its major surface 31a to its opposite major surface 31b, with an opening end 33a on the major surface 31a and an opening end 33b on the opposite major surface 31b operating as a liquid supply port and as a liquid discharge port, respectively. The light energy may be a laser beam enumerated by an excimer laser, a carbon dioxide laser or a YAG laser. The excimer laser is employed for the above reason.

In the above-described production method, the irregular surface portion is formed simultaneously with formation of the plate by injection molding. It is however possible to form the vicinity of the irregular surface portion of the plate by injection molding and to bond the resulting portion to a plate portion forming the remaining plate portion for ultimately forming the irregular surface portion in the completed plate. The portion inclusive of the irregular surface portion and the main plate portion may be formed of the same material or different materials.

In the above-described producing method, the surface of the plate 31 as the workpiece is formed with a groove for forming the irregular surface portion. Alternatively, the plate surface may be roughed for forming the irregular surface portion in the energy-concentrated portion.

In such case, a plate 61 which is to be an orifice plate is provided. In the instant embodiment, the plate 61 is formed of an organic material, such as a high molecular material. Specifically, the plate is a polyimide film.

Figure 19:
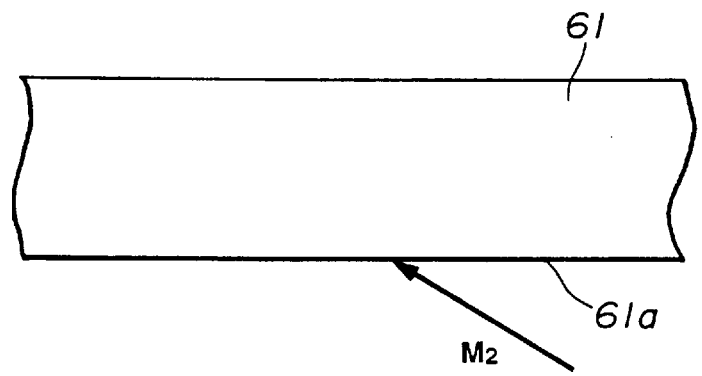
FIG. 19 shows a process step in the second modification of the method for producing the orifice plate employing a method for forming an orifice plate according to the present invention, and showing the step of roughing the plate surface.

Then, a major surface 61a of the plate 61, which is to be irradiated with the light energy, as shown in FIG. 19, is roughed by a sand-blasting method consisting in colliding fine particles against a workpiece energetically for physically scraping the workpiece surface by these particles. By roughing the substantially smooth polyimide surface, having a maximum height of surface irregularities amounting to tens of Angstroms, by the sand-blasting method, fine-sized irregularities with the maximum height on the order of five $\mu$m, are formed.

Figure 20:
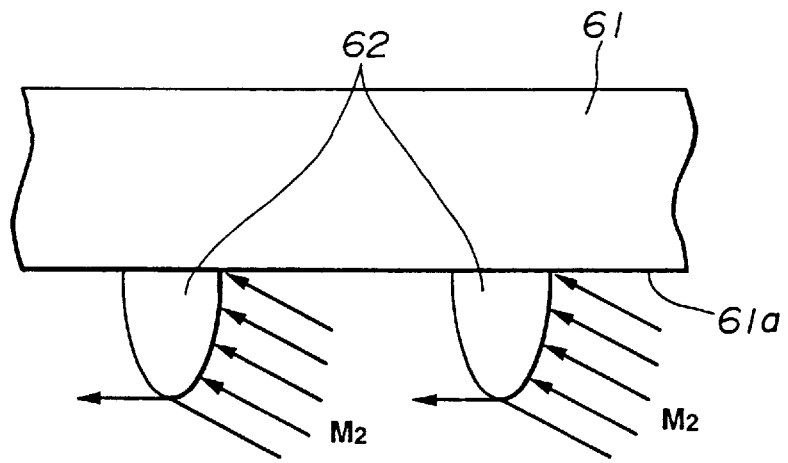
FIG. 20 shows a process step in the second modification of the method for producing the orifice plate employing a method for forming an orifice plate according to the present invention, and showing the state of radiating the light energy on a plate.
Figure 21:
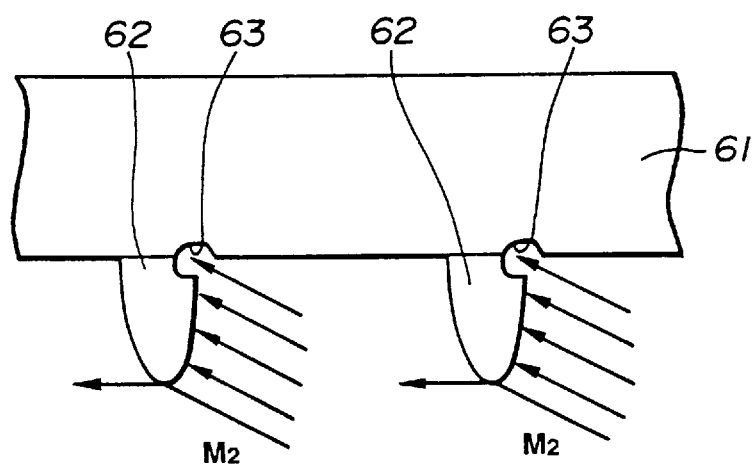
FIG. 21 shows a process step in the second modification of the method for producing the orifice plate employing a method for forming an orifice plate according to the present invention, and showing the state in which holes are being formed in the proximal portions of protrusions formed on a plate.
Figure 22:
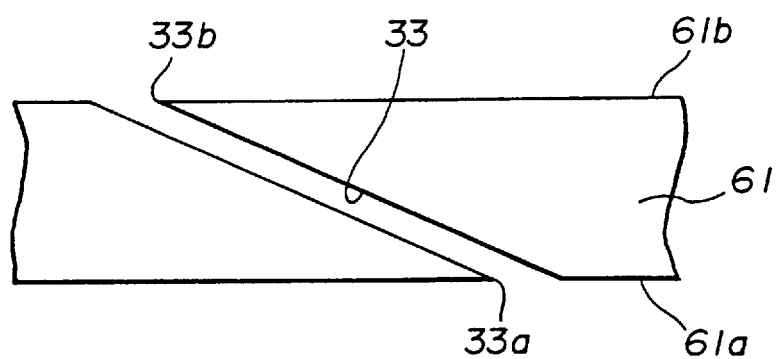
FIG. 22 shows a process step in the second modification of the method for producing the orifice plate employing a method for forming an orifice plate according to the present invention, and showing the state in which a first through-hole has been formed in the proximal portions of protrusions formed on a plate.

The light energy indicated by arrow M2 is radiated from the major surface 61a of the plate 61, as shown in FIG. 19. The incident light energy is collided against protrusions 62 formed by sand-blasting on the major surface 61a of the plate 61 and thereby trapped to initiate working thereat as shown in FIG. 20. Thus, small holes 63 are formed at the proximal portions of the protrusions 62 as shown in FIG. 21 for enhancing the engagement of the light energy with the workpiece for starting the working in the light energy incident direction. This produces a first through-hole 33 traversing the plate 61 along its thickness from its major surface 61a to its opposite major surface 61b, with an opening end 33a on the major surface 61a and an opening end 33b on the opposite major surface 61b operating as a liquid supply port and as a liquid discharge port, respectively.

A polyimide film whose surface was left intact and another polyimide film whose surface was worked by sand-blasting as described above were worked as described above for forming obliquely extending holes. It was found that, with the polyimide film whose surface was left intact and the polyimide film whose surface was worked by sand-blasting and thereby roughed as described above, a hole having an inclination angle of a maximum of 80° and a hole having an inclination angle of a maximum of 85° could be formed, respectively.

The light energy may be a laser beam enumerated by an excimer laser, a carbon dioxide laser or a YAG laser. The excimer laser is preferred for the above reason.

Although the plate surface is roughed by sand-blasting with the above-described producing method, the plate surface may also be roughed by a chemical etching method or a method employing an abrasive brush.

Although the organic materials, such as high molecular materials, are employed in the above-described embodiments as the material of the plate as the workpiece, organic materials or metals may also be employed as plate materials.

What is claimed is:

1. A method for forming a hole in a workpiece comprising the steps of providing a workpiece having a thickness dimension: forming an irregular surface portion in a surface portion of the workpiece, and radiating light energy on the irregular surface portion at an angle so as to form an elongate hole in the workpiece which is inclined relative to the thickness direction of the workpiece.

2. The method for forming a hole as claimed in claim 1 wherein the irregular surface portion in the workpiece is integrally formed by injection molding of the workpiece.

3. The method for forming a hole as claimed in claim 1 wherein the irregular surface portion in the workpiece is formed by sand-blasting.

4. The method for forming a hole as claimed in claim 1 wherein the irregular surface portion in the workpiece is formed by chemical etching.

5. The method for forming a hole as claimed in claim 1 wherein the irregular surface portion in the workpiece is formed using an abrasive brush.

6. The method for forming a hole as claimed in claim 1 wherein the light energy is a laser.

7. The method for forming a hole as claimed in claim 6 wherein the laser is an excimer laser.

8. The method for forming a hole as claimed in claim 1 wherein the workpiece is an organic material.

9. The method for forming a hole as claimed in claim 1 wherein the workpiece is an inorganic material.

10. The method for forming a hole as claimed in claim 1 wherein the workpiece is a metallic material.

11. The method for forming a hole as claimed in claim 1 wherein the workpiece adjacent the elongate hole has a thickness ranging between 15 μm and 200 μm.

12. The method for forming a hole as claimed in claim 11 wherein the workpiece is an orifice plate.

13. A method for forming a nozzle in a orifice plate for a printing head comprising the steps of:

providing an orifice plate having a thickness dimension and having an irregular surface portion:

irradiating the irregular surface portion of the orifice plate with light energy at an angle so as to form an elongate hole inclined at a pre-set angle relative to the direction of the thickness of the orifice plate.

14. A method for forming a first nozzle in an orifice plate for a printing head comprising:

forming a first nozzle inclined at a pre-set angle relative to the direction of thickness of the orifice plate; and forming a second nozzle normal to the direction of thickness of the orifice plate in adjacent to said first nozzle; wherein said first and second nozzles are formed by irradiation with a light energy and at least the portion in which the first nozzle is formed is formed with an irregular surface portion before being irradiated with said light energy.

15. A method of forming holes in a workpiece comprising the steps of:

providing a workpiece having a thickness dimension and having an irregular surface portion;

forming a first elongate hole extending through the workpiece at a first angular orientation generally normal to the thickness dimension adjacent the irregular surface portion;

forming a second elongate hole at the irregular surface portion extending through the workpiece at a second different angular orientation;

said first and second elongate holes being formed by laser light irradiation.

* * * * *